(12) United States Patent
Bhagavatula

(10) Patent No.: US 12,744,469 B2
(45) Date of Patent: Sep. 22, 2026

(54) HIGH SPEED FULL WAVE RECTIFIER CIRCUITS UTILIZING MOSFET

(71) Applicant: Mixed-Signal Devices Inc., Irvine, CA (US)

(72) Inventor: Srikar Bhagavatula, Irvine, CA (US)

(73) Assignee: Mixed-Signal Devices Inc., Irvine, CA (US)

( * ) Notice: Subject to any disclaimer, the term of this patent is extended or adjusted under 35 U.S.C. 154(b) by 180 days.

(21) Appl. No.: 18/814,359

(22) Filed: Aug. 23, 2024

(65) Prior Publication Data

US 2025/0070683 A1 Feb. 27, 2025

Related U.S. Application Data

(60) Provisional application No. 63/578,236, filed on Aug. 23, 2023.

(51) Int. Cl.
*H02M 7/06* (2006.01)
*H02M 7/217* (2006.01)

(52) U.S. Cl.
CPC ............. *H02M 7/217* (2013.01); *H02M 7/06* (2013.01)

(58) Field of Classification Search
CPC ................................ H02M 7/217; H02M 7/06
See application file for complete search history.

(56) References Cited

U.S. PATENT DOCUMENTS

| | | | | |
|---|---|---|---|---|
| 11,139,778 | B1 * | 10/2021 | Li | H03B 5/1212 |
| 2005/0174184 | A1 | 8/2005 | Wu | |
| 2007/0052399 | A1 | 3/2007 | Chen et al. | |
| 2020/0036284 | A1 | 1/2020 | Qin et al. | |
| 2020/0073428 | A1 | 3/2020 | Abouzied et al. | |
| 2020/0119690 | A1 | 4/2020 | Lee | |
| 2025/0337359 | A1 * | 10/2025 | Sakare | H03B 5/1209 |

OTHER PUBLICATIONS

International Search Report and Written Opinion for International Application No. PCT/US2024/043744, Search completed Oct. 5, 2024, Mailed Oct. 29, 2024, 13 Pgs.

* cited by examiner

*Primary Examiner* — Adolf D Berhane
(74) *Attorney, Agent, or Firm* — KPPB LLP

(57) ABSTRACT

In an embodiment of the invention, a full wave rectifier circuit includes an LC tank including an inductor and a first capacitor in parallel with a first end connected to supply voltage VDD, first and second transistors with drains connected to a second end of the LC tank, third transistor with source connected to source of the first transistor and to first current source, gate connected to gate of second transistor and to biasing signal VBN through first resistor and to input signal VINN through second capacitor, and drain connected to VDD, and fourth transistor with source connected to source of second transistor and to second current source, gate is connected to gate of first transistor and to biasing signal VBN through second resistor and to input signal VINP through third capacitor, and drain connected to VDD.

19 Claims, 16 Drawing Sheets

HIGH SPEED FULL WAVE RECTIFIER CIRCUITS UTILIZING MOSFET

CROSS-REFERENCE TO RELATED APPLICATIONS

The current application claims priority to U.S. Provisional Application No. 63/578,236, filed Aug. 23, 2023, entitled "Systems and Methods for Current Reuse Rectifiers and Current Steering Rectifiers," the disclosure of which is incorporated herein by reference.

FIELD OF THE INVENTION

The present invention relates to rectifier circuits and more specifically to full wave rectifiers utilizing transistors.

BACKGROUND OF THE INVENTION

A rectifier is an electric circuit that converts alternating current (AC) signals to direct current (DC) signals or to generate even multiples (2×, 4×, 6×, 8× etc) of input AC signals. Two types of rectifiers are half wave rectifiers and full wave rectifiers. Half wave rectifiers are typically inefficient and utilize only half of the input AC cycle while the other half-cycle is blocked. Full wave rectifiers utilize both the positive and negative half-cycles of the AC input to generate the output making it more efficient.

Some conventional architectures for implementing full wave rectifiers include centre-tapped rectifier and bridge rectifier. A centre-tapped rectifier (such as the one shown in FIG. 1) utilizes a centre-tapped transformer and two diodes. During each half cycle of the AC input, one diode conducts while the other is reversed biased. A full wave bridge rectifier (such as the one shown in FIG. 2) uses four or more diodes in a closed loop bridge formation with a resistive load. During each half cycle of the AC input, two diodes conduct in series while the other two diodes are reverse biased. A smoothing capacitor in parallel with the load across the output can improve the average DC output while reducing the AC variation.

Full wave rectifiers can also be implemented using transistors. An example is shown in FIG. 3. One transistor M0 is driven by positive input and generates current when the input is higher than a threshold, while the other transistor M1 is driven by negative input and generates current when negative input is higher than a threshold. Typically, the transistors are either both NMOS (N-type metal-oxide-semiconductor) or both PMOS (p-channel metal-oxide-semiconductor) but not mixed of both types. A spiral inductor L0 and capacitor C2 in parallel connect the output of the transistors voutp to ground. The output is single ended and an additional stage (active or passive balun) would be needed to convert the output from single ended to differential for use in most high frequency applications.

SUMMARY OF THE INVENTION

In many embodiments of the invention, a full wave rectifier circuit includes an LC tank including an inductor and a first capacitor in parallel with a first end connected to supply voltage VDD, first and second transistors with drains connected to a second end of the LC tank, third transistor with source connected to source of the first transistor and to first current source, gate connected to gate of second transistor and to biasing signal VBN through first resistor and to input signal VINN through second capacitor, and drain connected to VDD, and fourth transistor with source connected to source of second transistor and to second current source, gate is connected to gate of first transistor and to biasing signal VBN through second resistor and to input signal VINP through third capacitor, and drain connected to VDD.

In further embodiments of the invention, the transistors are MOSFET.

In additional embodiments of the invention, the transistors are NMOS transistors.

In more embodiments of the invention, the transistors are PMOS transistors.

In yet further embodiments of the invention, the first transistor and the second transistor have identical values.

In still more embodiments of the invention, the third transistor and the fourth transistor have identical values.

In further embodiments of the invention, the third transistor and the fourth transistor have larger values than the first transistor and the second transistor.

In additional embodiments of the invention, the third transistor and the fourth transistor have values than are at least four times the values of the first transistor and the second transistor.

In more embodiments of the invention, the third transistor and the fourth transistor have larger values than the first transistor and the second transistor.

Yet further embodiments of the invention include an output at the second end of the LC tank.

In still more embodiments of the invention, a balanced-unbalanced tuned load takes the place of the inductor and provides a differential output.

In further embodiments of the invention, a full wave rectifier circuit includes an LC tank including an inductor and a first capacitor connected in parallel, a first PMOS transistor, where its drain is connected to a first end of the LC tank, its source is connected to supply signal VDD, and its gate is connected to input signal VINP through a second capacitor and is connected to biasing signal VBP through a first resistor, a second PMOS transistor, where its drain is connected to the first end of the LC tank, its source is connected to supply signal VDD, and its gate is connected to input signal VINN through a third capacitor and is connected to biasing signal VBP through a second resistor, a first NMOS transistor, where its drain is connected to a second end of the LC tank, its source is connected to ground, and its gate is connected to input signal VINP through a fourth capacitor and is connected to biasing signal VBN through a third resistor, a second NMOS transistor, where its drain is connected to the second end of the LC tank, its source is connected to ground, and its gate is connected to input signal VINN through a fifth capacitor and is connected to biasing signal VBN through a fourth resistor, and an opamp having an non-inverting input connected to the drains of the first and second PMOS transistors through a fifth resistor and connected to the drains of the first and second NMOS transistors through a sixth resistor, and its output providing biasing signal VBP.

In additional embodiments of the invention, the first and second transistors are identical in values.

In more embodiments of the invention, the third and fourth transistors are identical in values.

In yet further embodiments of the invention, a passive transformer having a first input connected to the first end of the LC tank and a second input connected to the second end of the LC tank.

Still more embodiments of the invention also include an active differential amplifier having a first input connected to the first end of the LC tank and a second input connected to the second end of the LC tank.

In further embodiments of the invention, the opamp has an inverting input connected to a voltage source providing 0.5*VDD.

In additional embodiments of the invention, the value of the inductor L is selected for the circuit to produce a stronger output at an even multiple of the frequency of input signals VINP and VINN.

More embodiments of the invention also include a filter configured to pass an even multiple of the frequency of input signals VINP and VINN.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DISCLOSURE OF THE INVENTION

Turning now to the drawings, high speed full wave rectifier circuits utilizing MOSFET MOSFET (metal-oxide-semiconductor field-effect transistor) are disclosed. As discussed above, full wave rectifiers have many advantages over half wave rectifiers and are utilized in many common electronic applications such as those involving radio signals, motor control, power supplies, and battery charging. Current full wave rectifiers are limited in operating at high Gigahertz (GHz) speeds.

Various embodiments of the invention include two types of full rectifiers that utilize MOSFET transistors, current reuse rectifiers and current steering rectifiers.

Current Reuse Rectifier

Figure 1:
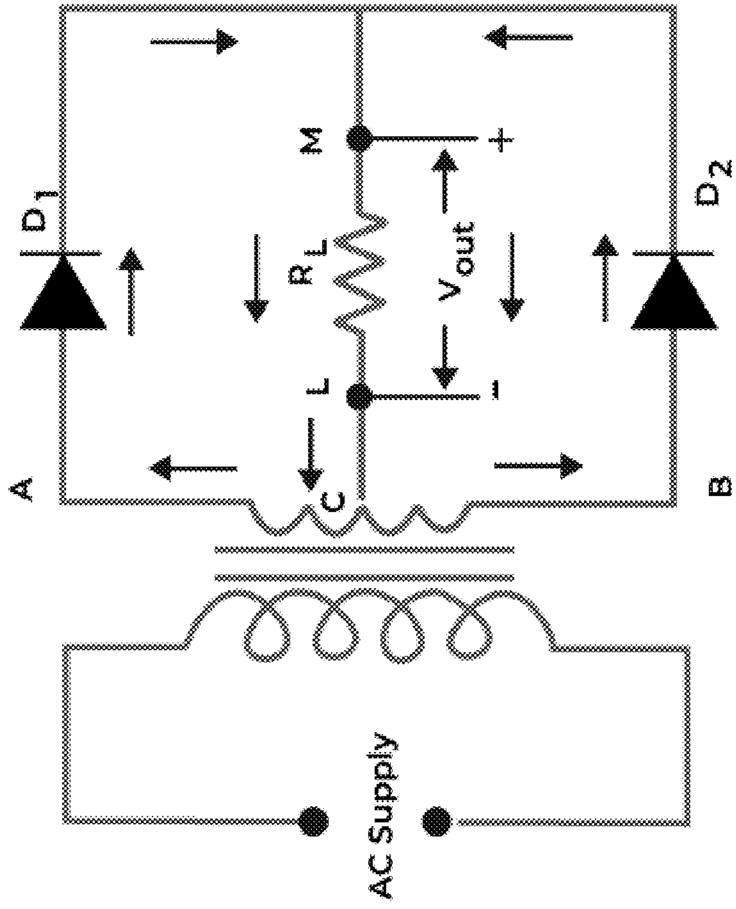
FIG. 1 is a circuit diagram illustrating a centre-tapped full wave rectifier.
Figure 2:
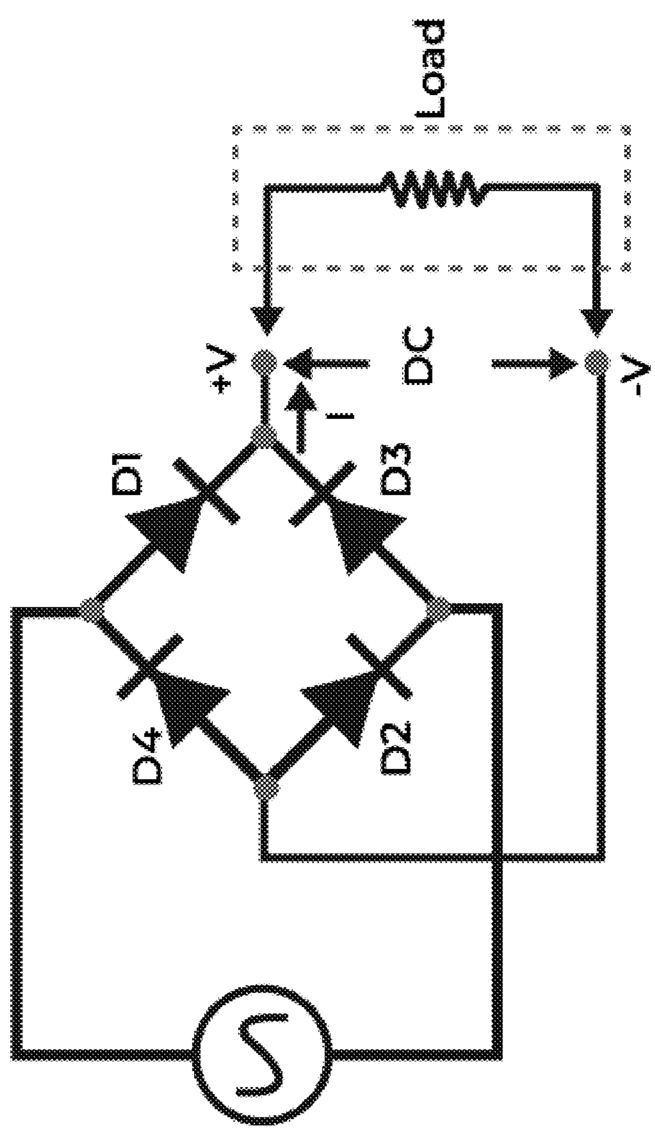
FIG. 2 is a circuit diagram illustrating a bridge full wave rectifier.
Figure 3:
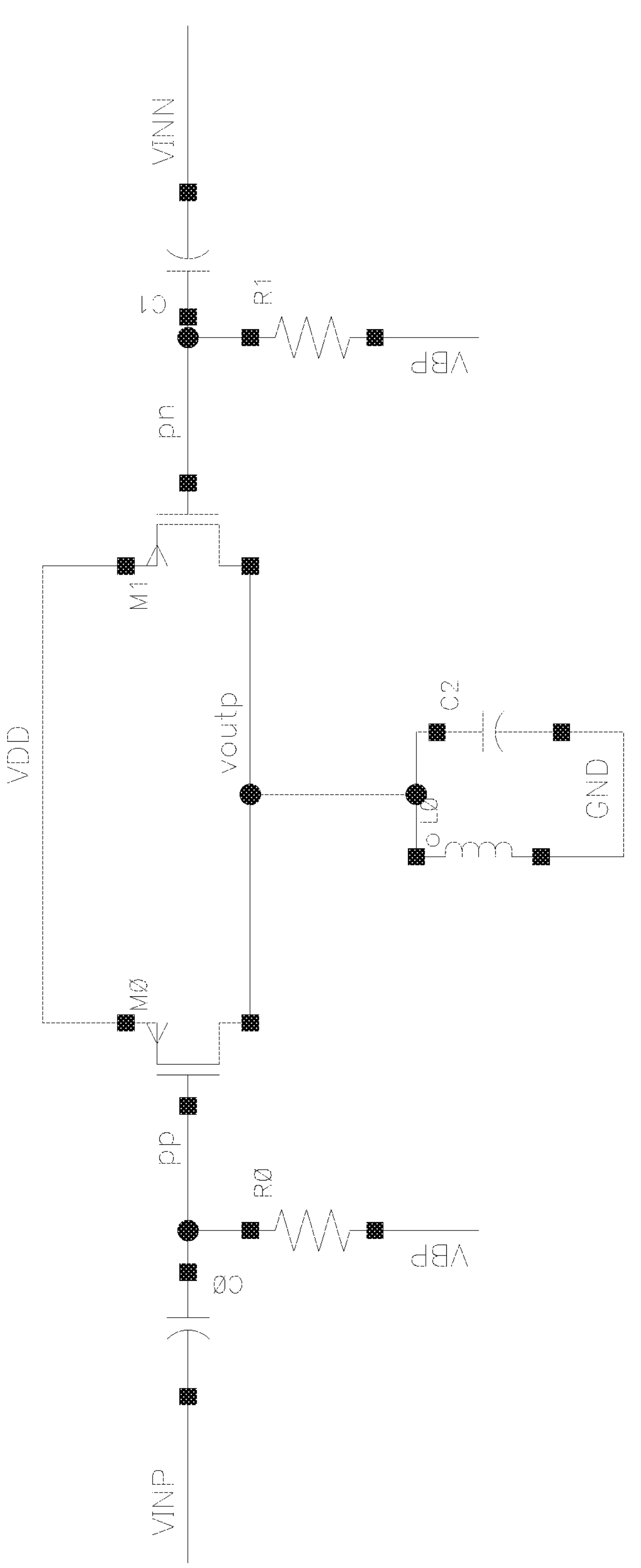
FIG. 3 is a circuit diagram illustrating a transistor-based full wave rectifier.

A current reuse rectifier in many embodiments of the invention utilizes both PMOS and NMOS transistors for rectification. Current from the PMOS tank is reused by the rectifier tank that uses NMOS. An opamp acting as a common mode feedback amplifier can be used to equalize common modes of the PMOS and NMOS tanks. In this architecture, the same output swing as a conventional rectifier can be achieved using half the current. Furthermore, embodiments utilizing current reuse can automatically generate differential outputs unlike prior art rectifiers (FIG. 3).

Figure 4:
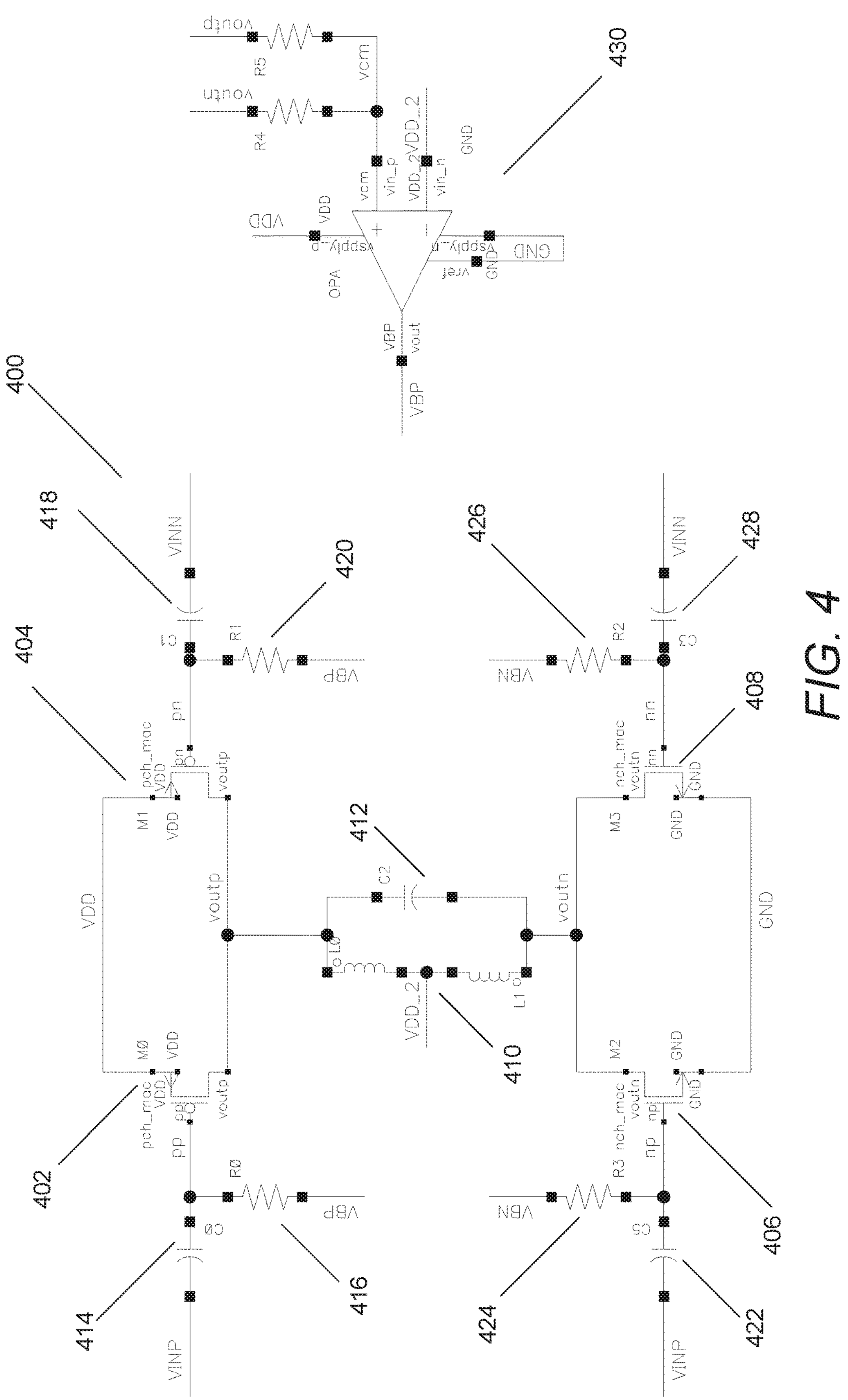
FIG. 4 is a circuit diagram illustrating a current reuse full wave rectifier in accordance with embodiments of the invention.

A circuit diagram for a current reuse rectifier 400 in accordance with several embodiments of the invention is illustrated in FIG. 4. Using common mode feedback, a pair of PMOS transistors M0 402 and M1 404 can be stacked with a pair of NMOS transistors M2 406 and M3 408. The drain of each pair of transistors are connected to each other—M0 402 and M1 404 to output voutp, M2 406 and M3 408 to output voutn. The outputs voutp of one pair of transistors M0 402 and M1 404 are connected to the outputs voutn of the other pair of transistors M2 406 and M3 408 through an LC tank. LC tank includes inductor 410 and a capacitor C2 412 in parallel. The drains of M0 402 and M1 404 are connected to a first end of the LC tank. The drains of M2 406 and M3 408 are connected to a second end of the LC tank. In many embodiments of the invention, a differential inductor with a center-tap is used which is represented by L0 and L1, where the electric flux flows 180 degrees from each other.

The source of M0 402 and the source of M1 404 are connected to supply voltage VDD. The source of M2 406 and the source of M3 408 are connected to ground. The gate of M0 402 is connected to input signal VINP through capacitor C0 414 and is connected to biasing signal VBP through resistor R0 416. The gate of M1 404 is connected to input signal VINN through capacitor C1 418 and is connected to biasing signal VBP through resistor R1 420. The gate of M2 406 is connected to input signal VINP through capacitor C5 422 and is connected to biasing signal VBN through resistor R3 424. The gate of M3 408 is connected to input signal VINN through capacitor C3 428 and is connected to biasing signal VBN through resistor R2 426.

The resistor and capacitor pairs connected to the gate of each transistor (R0 and C0 to M0, R1 and C1 to M1, R3 and C5 to M2, and R2 and C3 to M3) can act as biasing circuits. One skilled in the art will recognize that components other than these specific resistors and capacitors and other connections may be utilized in accordance with embodiments of the invention.

In many embodiments of the invention, transistors M0 and M1 are PMOS transistors. In further embodiments, M0 and M1 match each other in values. In many embodiments of the invention, transistors M2 and M3 are NMOS transistors. In further embodiments, M2 and M3 match each other in values.

Opamp 430 provides common mode feedback by taking in the common-mode voltage (average of Voutp and Voutn, averaged by the resistors R4 and R5) into its non-inverting input. Its inverting input goes to desired common mode voltage which is set to be 0.5*Vdd. The output of opamp 430 is VBP provided to the circuit above. The bias voltage VBP can be maintained by an effect referred to as DC biasing or AC coupling. One skilled in the art will recognize that other circuitry may be utilized for common mode feedback in accordance with embodiments of the invention.

In many embodiments of the invention, VINP and VINN are first and second differential input signals, and voutp and voutn are first and second differential output signals.

In many embodiments of the invention, the output of a current reuse rectifier is generated at even multiples of the input frequency, where the strongest two times the input frequency. Changing the value of the inductor L can produce a stronger output at a different multiple and a filter can be used to obtain that multiple. The frequency can be determined by $$F = \frac{1}{2\pi * \sqrt{LC}}.$$

Figure 5:
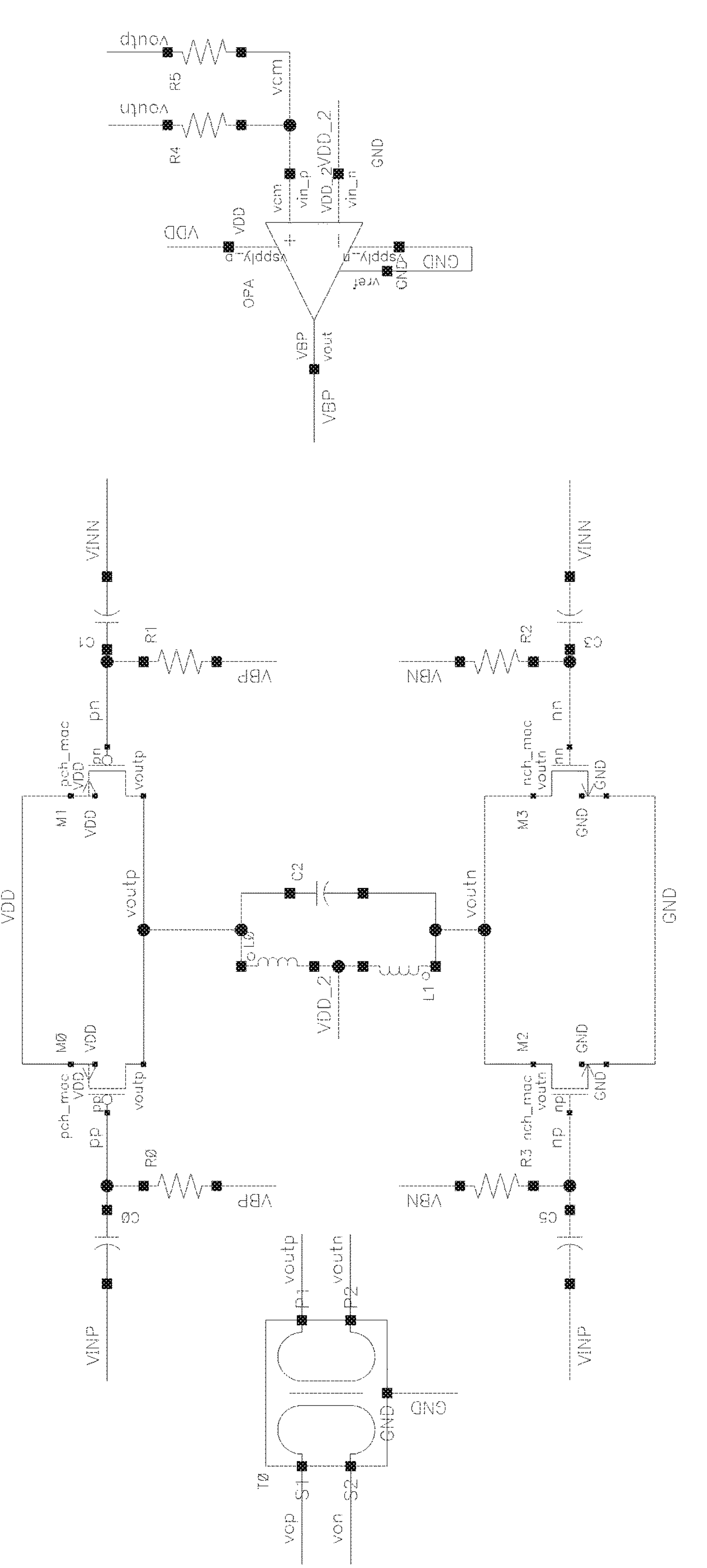
FIG. 5 is a circuit diagram illustrating a current reuse full wave rectifier followed by a passive transformer in accordance with embodiments of the invention.

FIG. 5 illustrates a current reuse full wave rectifier followed by a passive transformer in accordance with embodiments of the invention.

Figure 6:
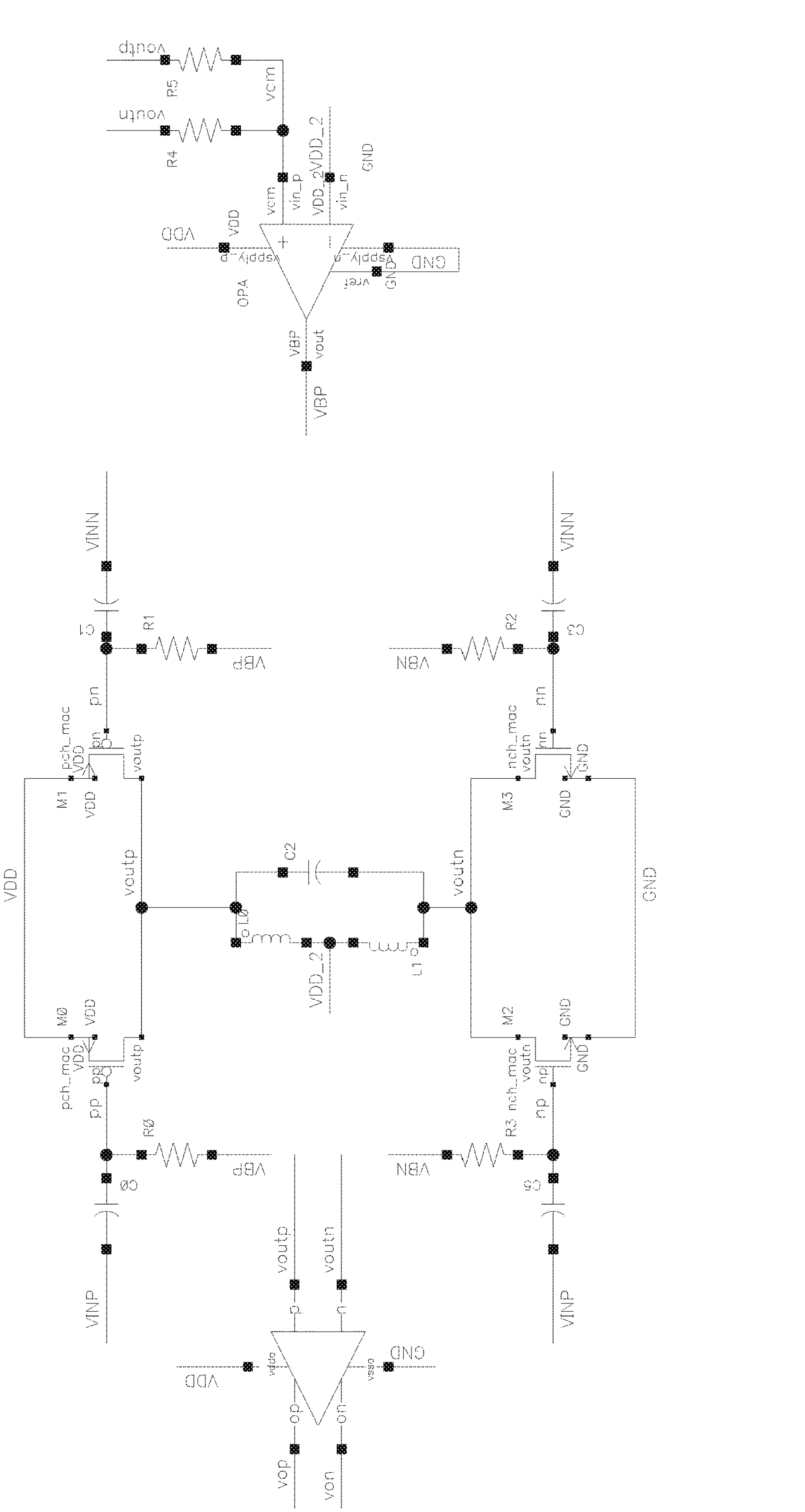
FIG. 6 is a circuit diagram illustrating a current reuse full wave rectifier followed by an active differential amplifier in accordance with embodiments of the invention.

FIG. 6 illustrates a current reuse full wave rectifier followed by an active differential amplifier in accordance with embodiments of the invention.

Figure 7:
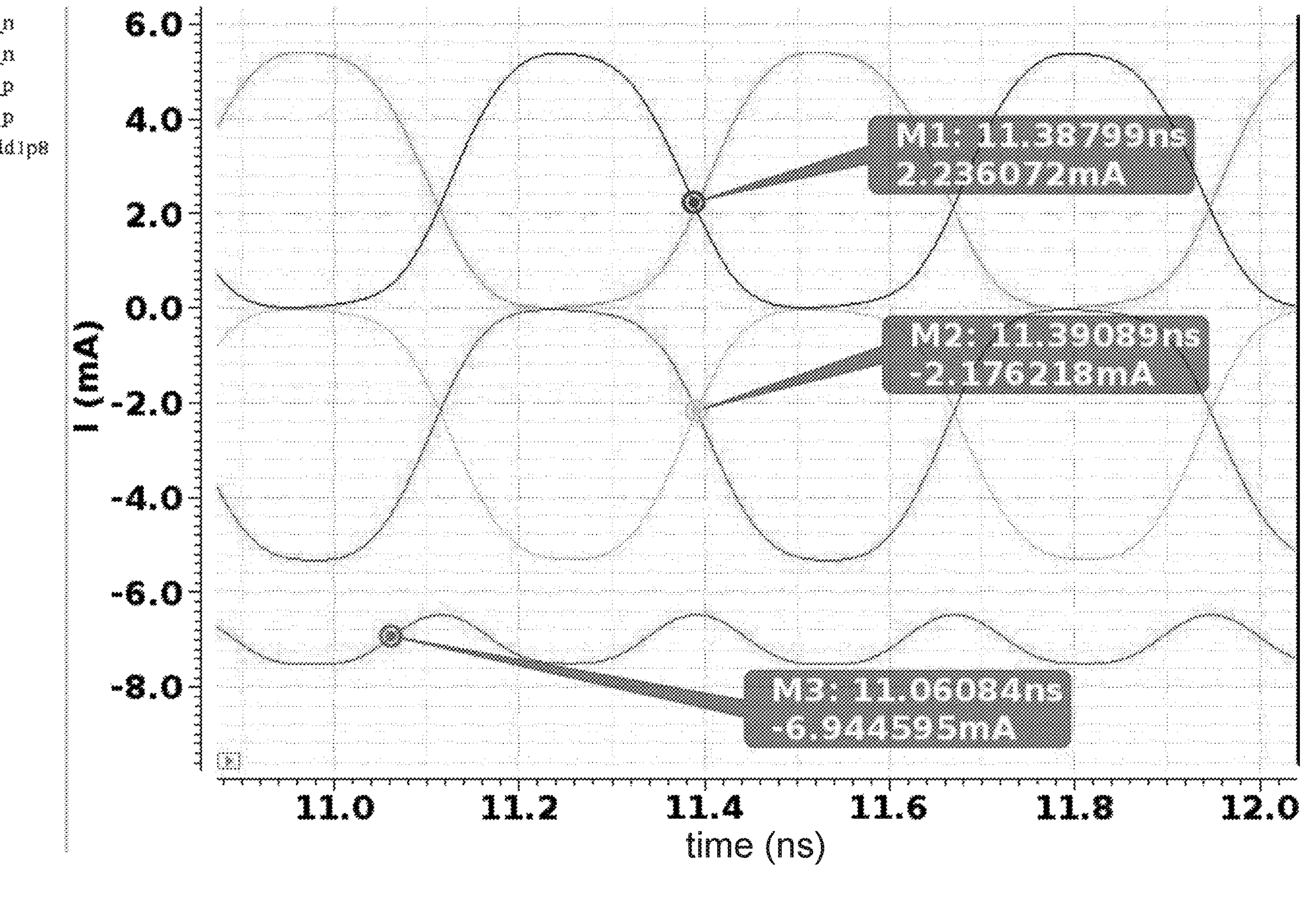
FIG. 7 is graph illustrating current over time through components of a current reuse full wave rectifier in accordance with embodiments of the invention.

FIG. 7 is graph illustrating current over time through components of a current reuse full wave rectifier in accordance with embodiments of the invention.

Figure 8:
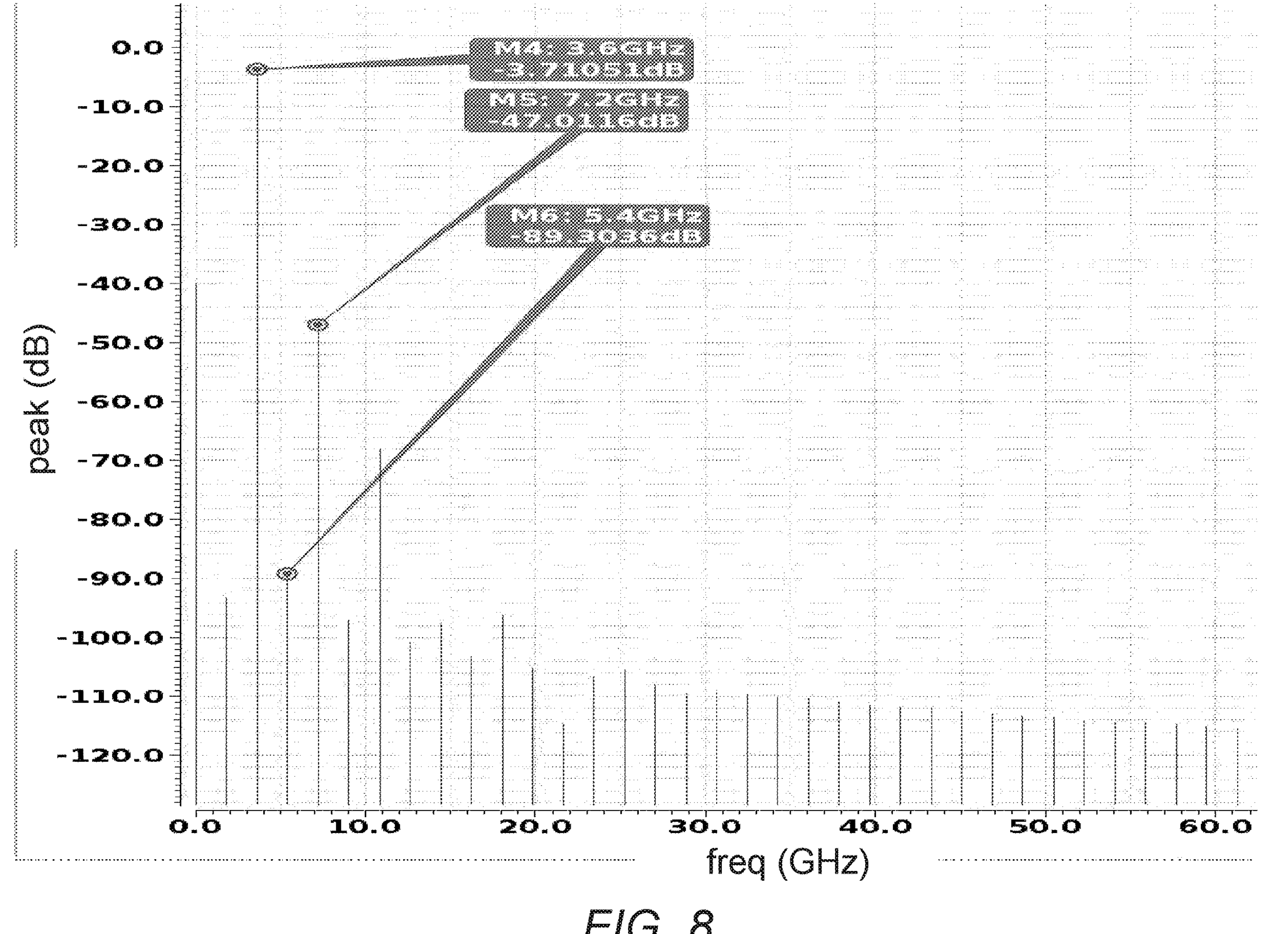
FIG. 8 is a graph illustrating peak strength of frequencies output by a current reuse full wave rectifier in accordance with embodiments of the invention.

FIG. 8 is a graph illustrating peak strength of frequencies output by a current reuse full wave rectifier in accordance with embodiments of the invention. The strongest frequency is 3.6 GHz, which is two times the input frequency.

While specific circuits for current reuse rectifiers are described above, one skilled in the art will recognize that any of a variety of circuitry may be utilized in accordance with embodiments of the invention. Given the above descriptions, one skilled in the art may select appropriate values for the components for a desired output.

Current Steering Rectifier

The output voltage swing in conventional rectifiers varies significantly with PVT (process, voltage, temperature) variations. Moreover, leakage in modern technologies causes low efficiency. Switches can stay on even when the input voltage is below the threshold, and a high current is needed to achieve a good output swing. Significant power is often consumed to achieve low noise. The total power consumed in the circuit is dependent on the input swing—a higher input signal results in larger current consumption. Operation near the subthreshold limits the speed of operation for MOS devices, making it harder for the design to function at microwave frequencies (greater than 25 GHz).

In additional embodiments of the invention, a current steering rectifier can address the deficiencies described above, and can achieve full wave rectification at high speeds without using common mode feedback as in the current reuse design. Advantages of a current steering design include tighter control, lower noise, and the ability to reach higher speeds than a conventional rectifier. Current steering rectifiers in accordance with embodiments of the invention can reach up to 100 GHz or more, which is difficult to achieve with conventional rectifiers.

Figure 9:
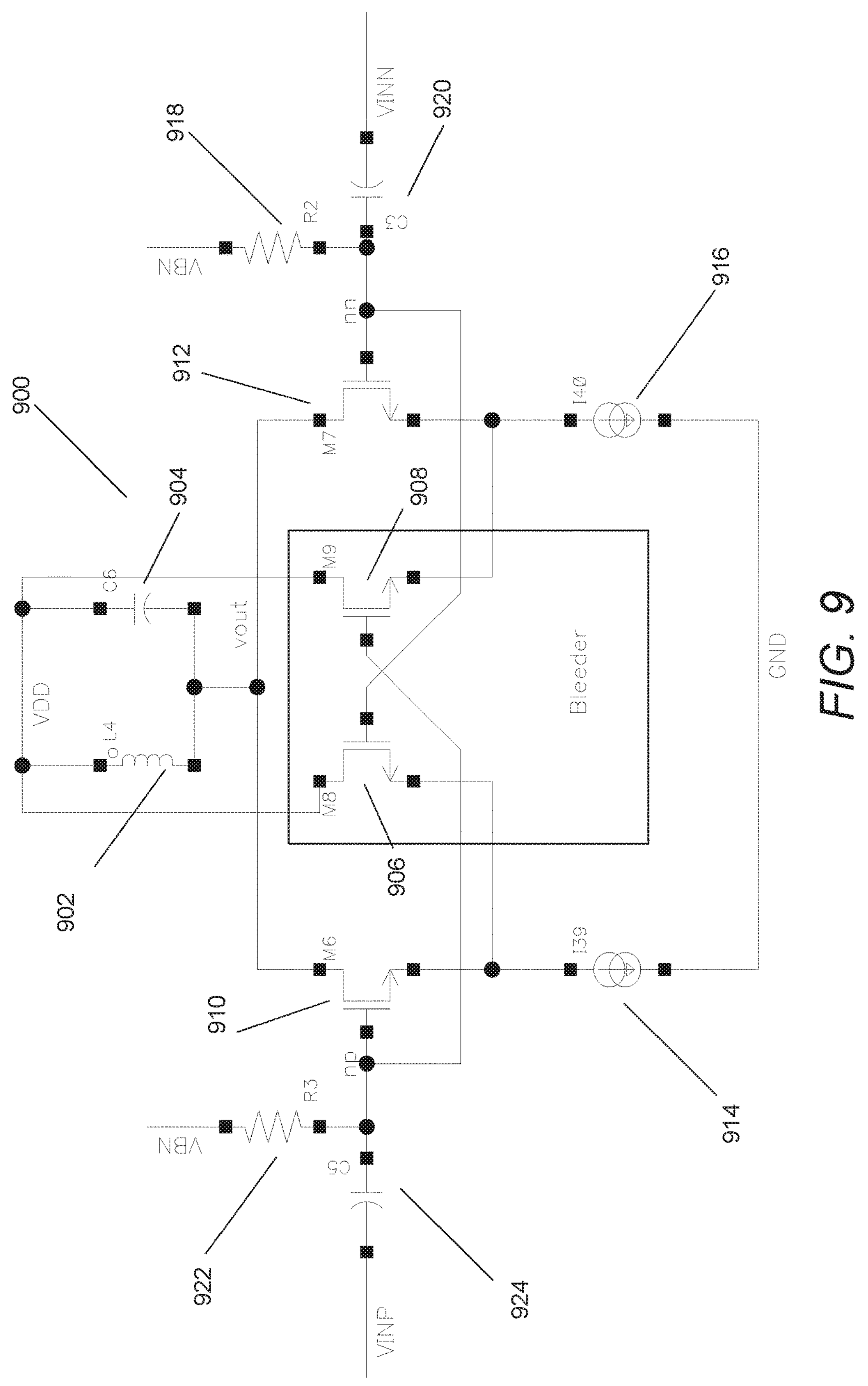
FIG. 9 is a circuit diagram illustrating a current steering full wave rectifier in accordance with embodiments of the invention.

A current steering rectifier circuit in accordance with many embodiments of the invention is illustrated in FIG. 9. The current steering rectifier 900 utilizes four transistors of the same type. In the illustrated embodiment NMOS transistors are used. In other embodiments, other types of transistors such as PMOS may be used, as long as they are the same type.

The current steering rectifier 900 includes an LC tank with inductor L4 902 and capacitor C6 904 in parallel. A first end of the LC tank connects to the drains of NMOS transistors M6 910 906 and M7 912. A second end of the LC tank connects to supply voltage VDD. The source of transistor M6 910 and the source of transistor M8 906 are tied together to a current source I39 914. The source of transistor M7 912 and the source of transistor M9 908 are tied together to a current source I40 916. The gate of transistor M7 912 is connected to the gate of transistor M8 906, which is then connected to biasing signal VBN through resistor R2 918 and connected to input signal VINN through capacitor C3 920. The gate of transistor M6 is connected to the gate of transistor M9, which is then connected to biasing signal VBN through resistor R3 922 and connected to input signal VINP through capacitor C5 924. The drains of transistor M8 906 and transistor M9 908 are connected to supply voltage VDD.

In many embodiments of the invention, VINP and VINN are first and second differential input signals. In some embodiments of the invention, vout output signal is taken from the first end of the LC tank.

Transistors M6 910 and M7 912 act as current steering switches, while all the transistors are DC biased in saturation. This enables the circuit to operate at significantly higher frequencies. Current consumption is independent of input voltage signals, and is determined by I39 914 and I40 916, which is set by the reference current sources. In many embodiments of the invention, the values of transistors in the M8 906 and M9 908 bleeder path are larger than transistors M6 910 and M7 912 by an N:1 ratio (e.g., 4:1 to 10:1), which can be used to reduce conduction angle. One skilled in the art may identify and use different ratios depending on design trade-offs such as speed, efficiency, etc. In several embodiments, transistors M8 906 and M9 908 should have identical values, while transistors M6 910 and M7 912 should have identical values.

Figure 10:
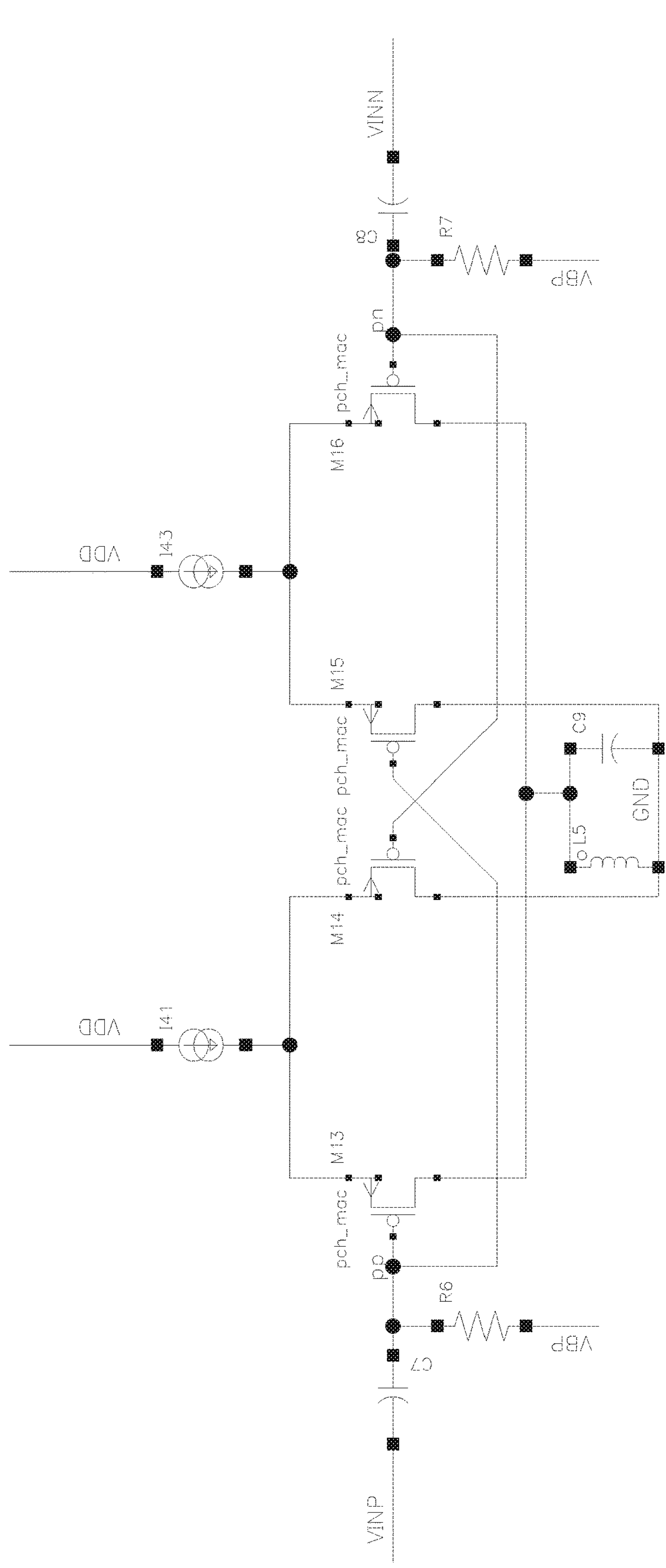
FIG. 10 is a circuit diagram illustrating a current steering full wave rectifier utilizing PMOS with LC tank tuned load in accordance with embodiments of the invention.

FIG. 10 is a circuit diagram illustrating a current steering full wave rectifier utilizing PMOS with LC tank tuned load in accordance with embodiments of the invention.

Figure 11:
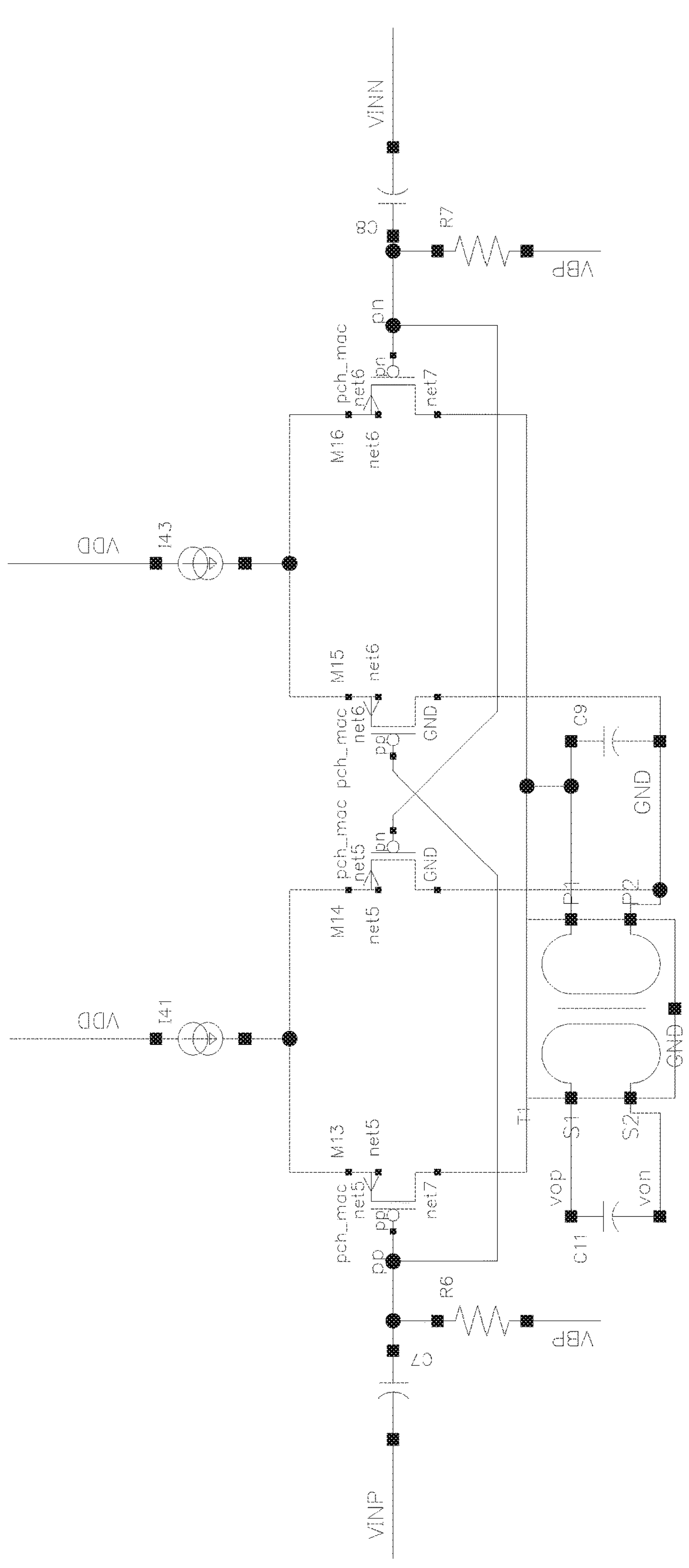
FIG. 11 is a circuit diagram illustrating a current steering full wave rectifier utilizing PMOS with Balun (balanced unbalanced) tuned load in accordance with embodiments of the invention.

FIG. 11 illustrates a current steering full wave rectifier utilizing PMOS with Balun tuned load in accordance with embodiments of the invention. This circuit can be used to generate differential signals vop/von.

Figure 12:
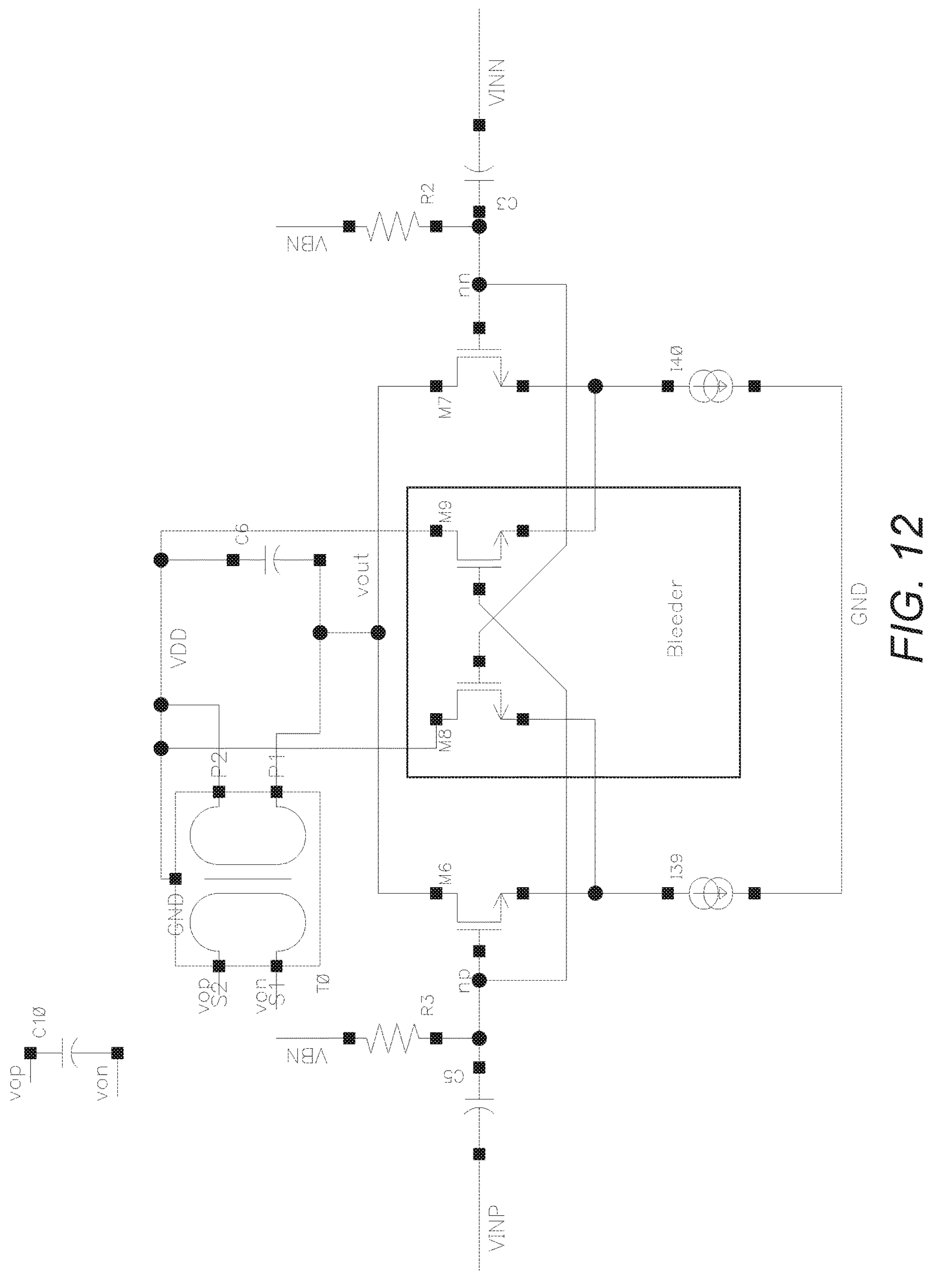
FIG. 12 is a circuit diagram illustrating a current steering full wave rectifier utilizing NMOS with Balun tuned load in accordance with embodiments of the invention.

FIG. 12 illustrates a current steering full wave rectifier utilizing NMOS with Balun tuned load in accordance with embodiments of the invention. This circuit can be used generate differential signals vop/von.

Figure 13:
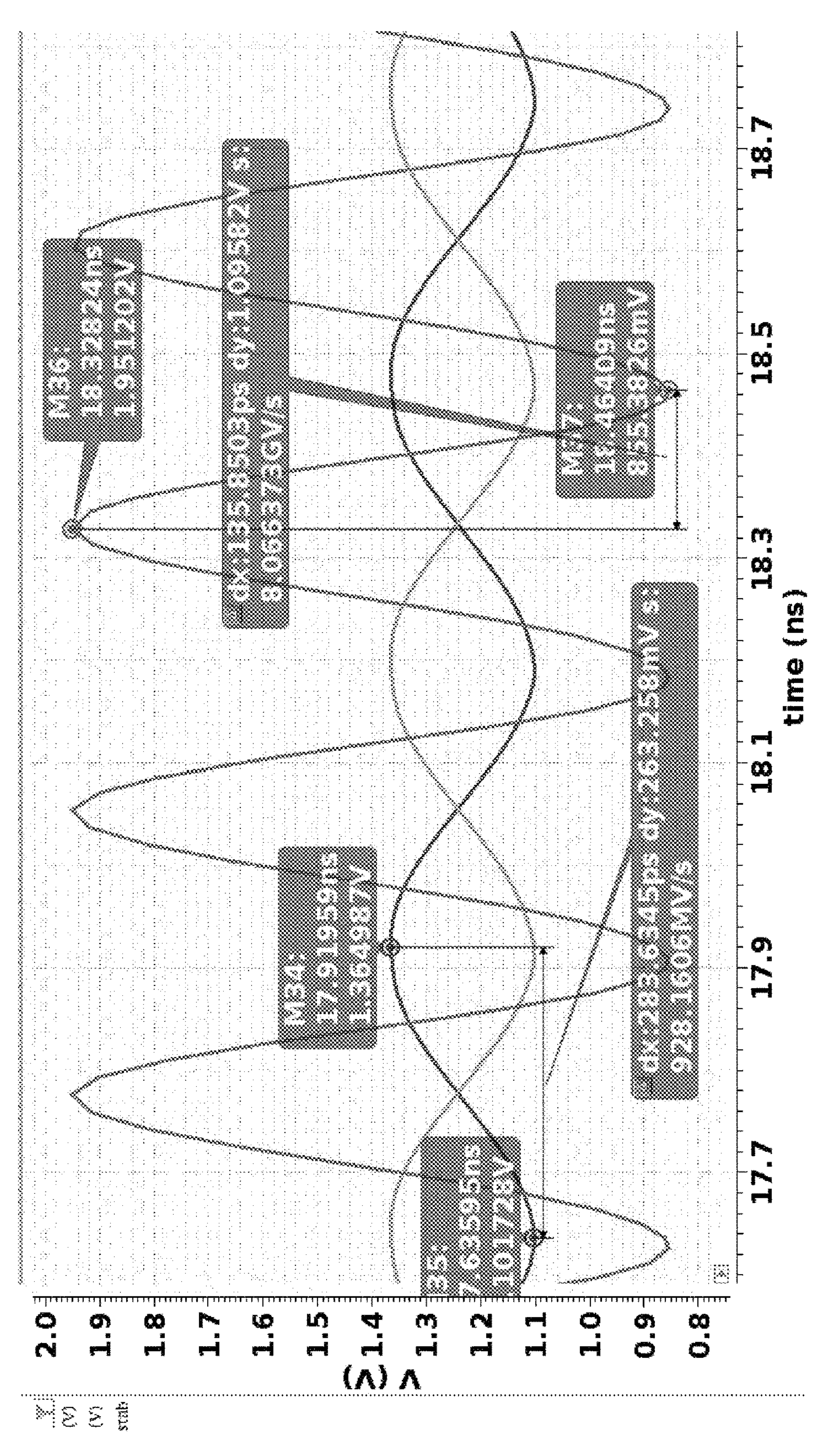
FIG. 13 is graph illustrating voltage over time through components of a current reuse full wave rectifier in accordance with embodiments of the invention.

FIG. 13 is graph illustrating voltage over time through components of a current reuse full wave rectifier in accordance with embodiments of the invention.

Figure 14:
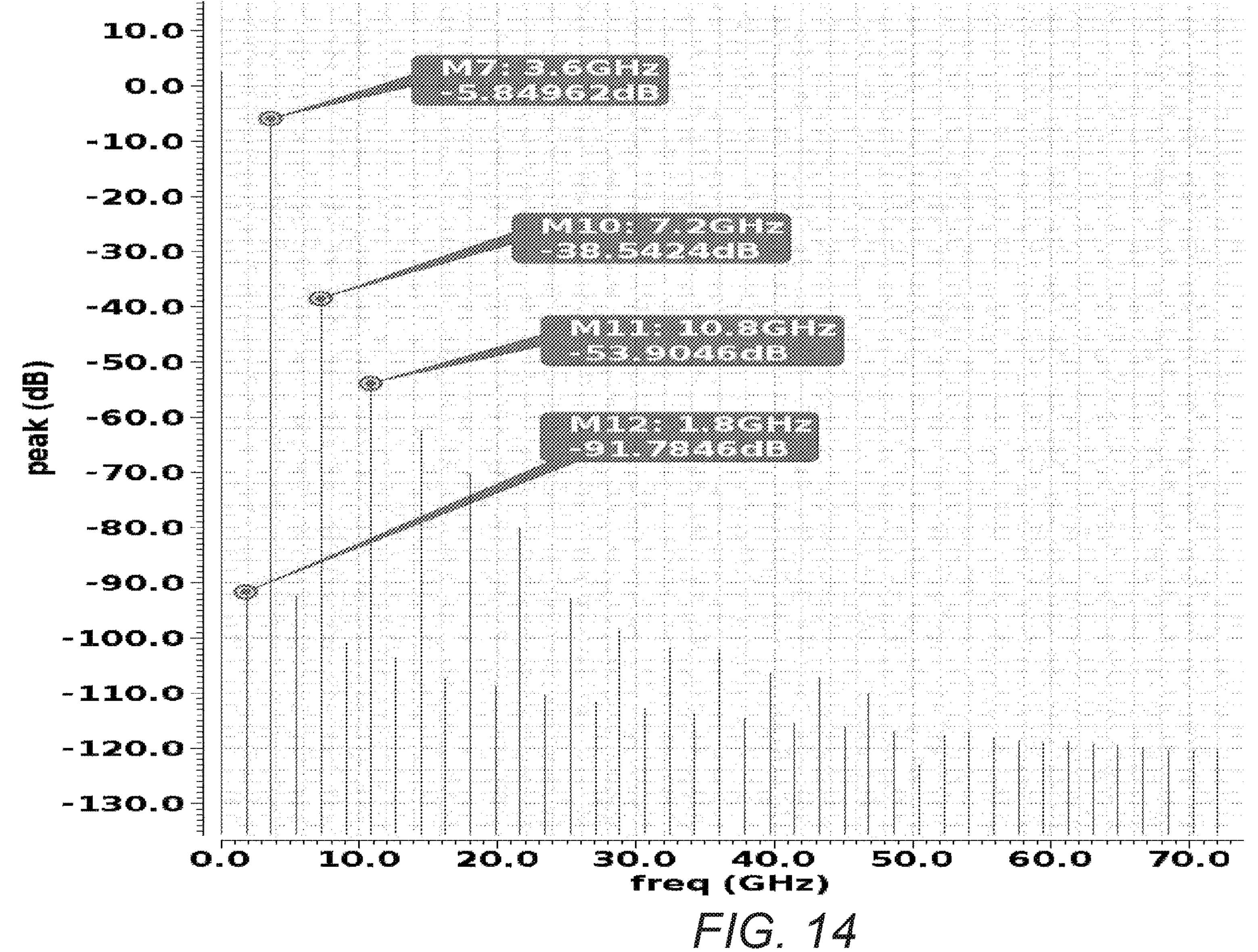
FIG. 14 is a graph illustrating peak strength of frequencies output by a current steering full wave rectifier in accordance with embodiments of the invention.

FIG. 14 is a graph illustrating peak strength of frequencies output by a current steering full wave rectifier in accordance with embodiments of the invention. A prominent frequency is 3.6 GHz, which is two times the input frequency 1.8 GHz.

Figure 15:
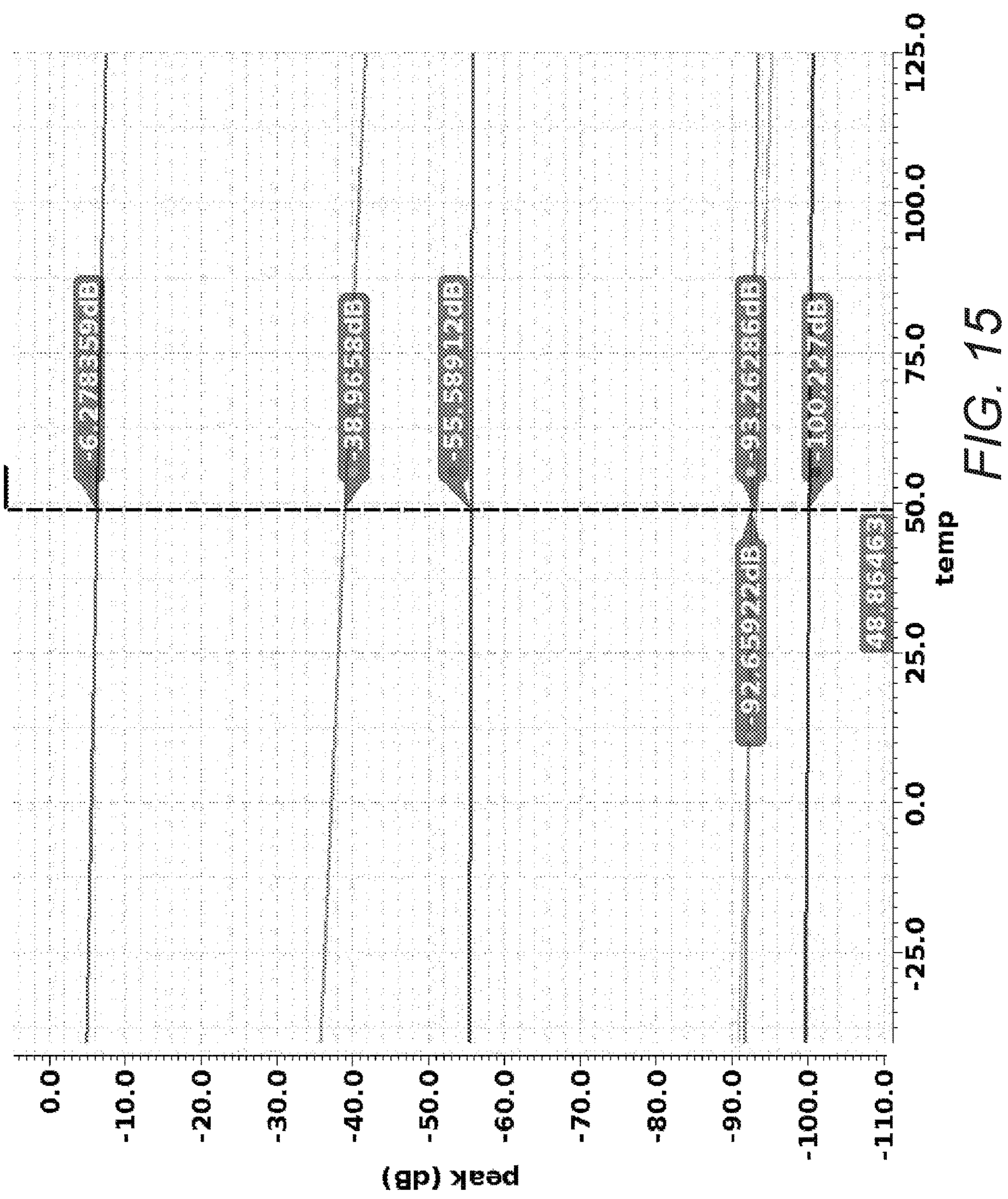
FIG. 15 is a graph illustrating peak strength (dB) of signals in a current steering full wave rectifier across different temperatures in accordance with embodiments of the invention.

FIG. 15 is a graph illustrating peak strength (dB) of signals in a current steering full wave rectifier across different temperatures.

Figure 16:
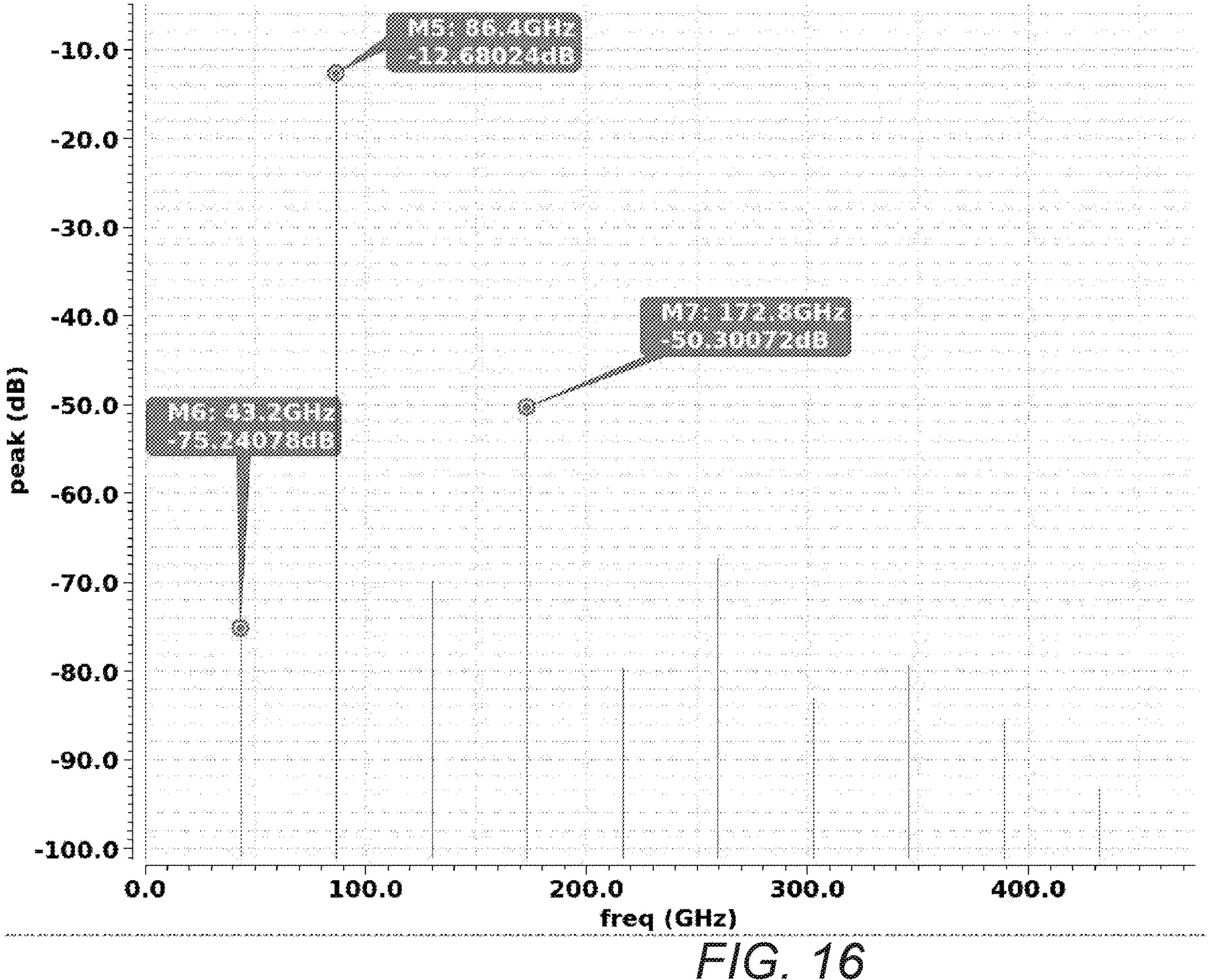
FIG. 16 is a graph illustrating peak strength of frequencies output by a current steering full wave rectifier in accordance with embodiments of the invention.

FIG. 16 is a graph illustrating peak strength of frequencies output by a current steering full wave rectifier in accordance with embodiments of the invention. The input provided to the rectifier is 43.2 GHz and the primary output is 86.4 GHz.

While specific circuits for current steering rectifiers are described above, one skilled in the art will recognize that any of a variety of circuitry may be utilized in accordance with embodiments of the invention. Given the above descriptions, one skilled in the art may select appropriate values for the components for a desired output.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A full wave rectifier circuit comprising:

an LC tank comprising an inductor and a first capacitor connected in parallel, where a first end of the LC tank is connected to supply voltage VDD;

a first transistor, where its drain is connected to a second end of the LC tank;

a second transistor, where its drain is connected to the second end of the LC tank;

a third transistor, where its source is connected to the source of the first transistor and to a first current source, its gate is connected to the gate of the second transistor and to biasing signal VBN through a first resistor and to input signal VINN through a second capacitor, and its drain is connected to supply voltage VDD; and a fourth transistor, where its source is connected to the source of the second transistor and to a second current source, its gate is connected to the gate of the first transistor and to biasing signal VBN through a second resistor and to input signal VINP through a third capacitor, and its drain is connected to supply voltage VDD.

2. The full wave rectifier circuit of claim 1, where the transistors are MOSFET.

3. The full wave rectifier circuit of claim 2, where the transistors are NMOS transistors.

4. The full wave rectifier circuit of claim 2, where the transistors are PMOS transistors.

5. The full wave rectifier circuit of claim 1, where the first transistor and the second transistor have identical values.

6. The full wave rectifier circuit of claim 1, where the third transistor and the fourth transistor have identical values.

7. The full wave rectifier circuit of claim 1, where the third transistor and the fourth transistor have larger values than the first transistor and the second transistor.

8. The full wave rectifier circuit of claim 6, where the third transistor and the fourth transistor have values than are at least four times the values of the first transistor and the second transistor.

9. The full wave rectifier circuit of claim 1, where the third transistor and the fourth transistor have larger values than the first transistor and the second transistor.

10. The full wave rectifier circuit of claim 1, further comprising an output at the second end of the LC tank.

11. The full wave rectifier circuit of claim 1, wherein a balanced-unbalanced tuned load takes the place of the inductor and provides a differential output.

12. A full wave rectifier circuit comprising:

an LC tank comprising an inductor and a first capacitor connected in parallel;

a first PMOS transistor, where its drain is connected to a first end of the LC tank, its source is connected to supply signal VDD, and its gate is connected to input signal VINP through a second capacitor and is connected to biasing signal VBP through a first resistor;

a second PMOS transistor, where its drain is connected to the first end of the LC tank, its source is connected to supply signal VDD, and its gate is connected to input signal VINN through a third capacitor and is connected to biasing signal VBP through a second resistor;

a first NMOS transistor, where its drain is connected to a second end of the LC tank, its source is connected to ground, and its gate is connected to input signal VINP through a fourth capacitor and is connected to biasing signal VBN through a third resistor;

a second NMOS transistor, where its drain is connected to the second end of the LC tank, its source is connected to ground, and its gate is connected to input signal VINN through a fifth capacitor and is connected to biasing signal VBN through a fourth resistor; and an opamp having an non-inverting input connected to the drains of the first and second PMOS transistors through a fifth resistor and connected to the drains of the first and second NMOS transistors through a sixth resistor, and its output providing biasing signal VBP.

13. The full wave rectifier circuit of claim 12, where the first and second transistors are identical in values.

14. The full wave rectifier circuit of claim 12, where the third and fourth transistors are identical in values.

15. The full wave rectifier circuit of claim 12, further comprising a passive transformer having a first input connected to the first end of the LC tank and a second input connected to the second end of the LC tank.

16. The full wave rectifier circuit of claim 12, further comprising an active differential amplifier having a first input connected to the first end of the LC tank and a second input connected to the second end of the LC tank.

17. The full wave rectifier circuit of claim 12, wherein the opamp has an inverting input connected to a voltage source providing 0.5*VDD.

18. The full wave rectifier circuit of claim 12 wherein the value of the inductor L is selected for the circuit to produce a stronger output at an even multiple of the frequency of input signals VINP and VINN.

19. The full wave rectifier circuit of claim 12 further comprising a filter configured to pass an even multiple of the frequency of input signals VINP and VINN.

* * * * *